United States Patent
Pintard et al.

[15] 3,647,247
[45] Mar. 7, 1972

[54] TUBULAR CONNECTOR FOR EXPANSION JOINTS

[72] Inventors: Frederick Bruce Pintard, Somerville; George Michael Mollick, Middlesex, both of N.J.

[73] Assignee: Johns-Manville Corporation, New York, N.Y.

[22] Filed: July 24, 1969

[21] Appl. No.: 844,478

[52] U.S. Cl..............................285/229, 138/119, 156/196, 285/235, 285/405
[51] Int. Cl......................................F16l 51/02
[58] Field of Search...................285/229, 235, 260, 55, 424, 285/236, 405; 138/109, 119

[56] References Cited

UNITED STATES PATENTS

| 3,508,587 | 4/1970 | Mauch | 138/119 |
| 3,343,567 | 9/1967 | Mulligan et al. | 138/119 |
| 3,557,275 | 1/1971 | Longshaw et al. | 138/109 X |
| 2,866,479 | 12/1958 | Mahady et al. | 285/235 X |
| 1,626,772 | 5/1927 | Worden | 285/229 X |
| 2,088,922 | 8/1937 | Porteous | 285/55 |
| 2,371,556 | 3/1945 | Steffens et al. | 285/55 |
| 3,099,467 | 7/1963 | Godshalk | 285/229 X |
| 3,365,217 | 1/1968 | Cooper | 285/229 |

FOREIGN PATENTS OR APPLICATIONS

| 1,064,086 | 12/1953 | France | 285/229 |
| 763,972 | 12/1956 | Great Britain | 285/229 |
| 540,409 | 10/1941 | Great Britain | 285/236 |

Primary Examiner—Thomas F. Callaghan
Attorney—John A. McKinney and Robert M. Krone

[57] ABSTRACT

An expansion joint for joining adjacent ends of a pair of ducts wherein the expansion joint comprises a tubular connector having a turnable flange that is attached directly to the flange of each duct. Also, the tubular connector is made by a process which permits the folding thereof in sheetlike form.

8 Claims, 15 Drawing Figures

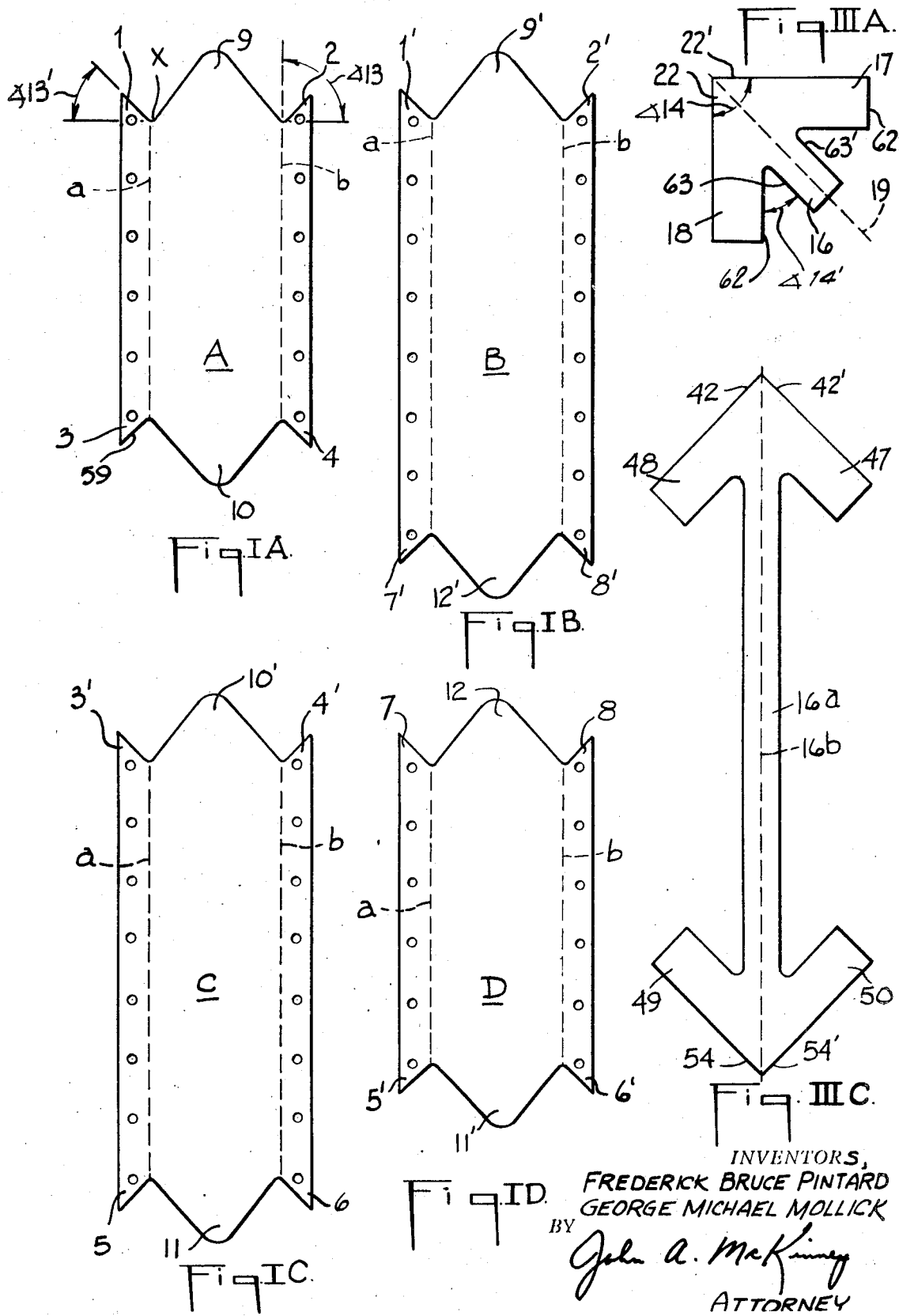

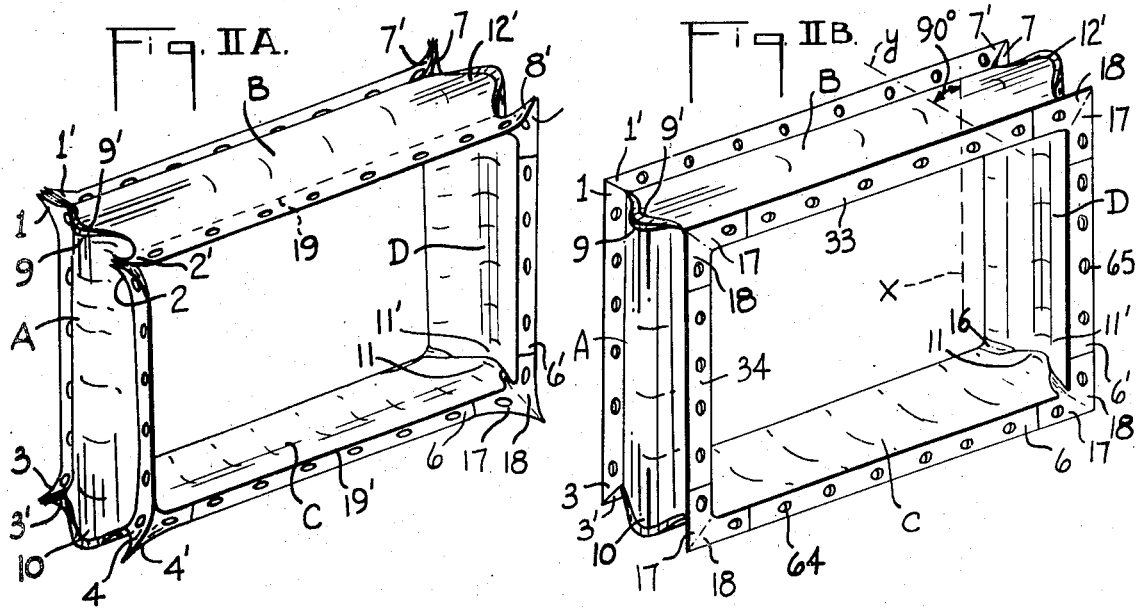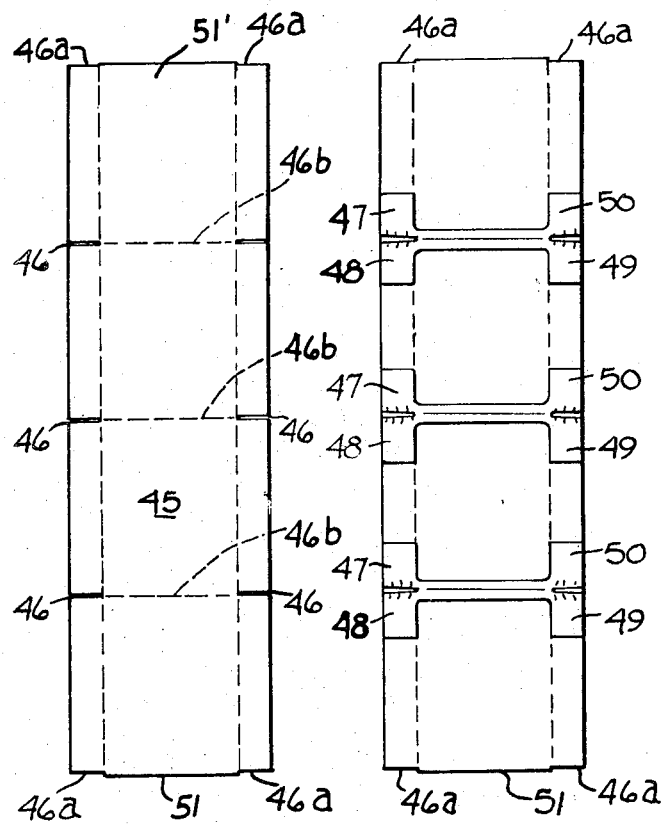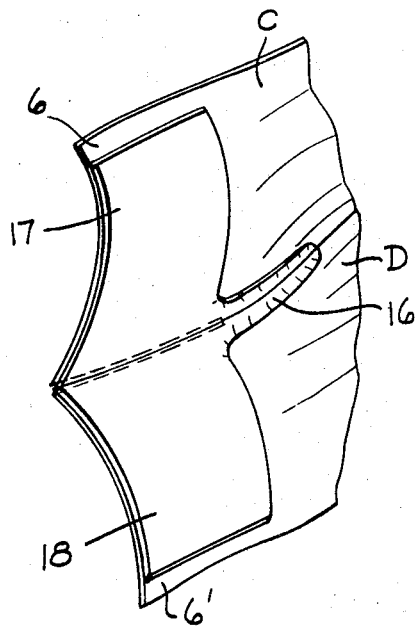

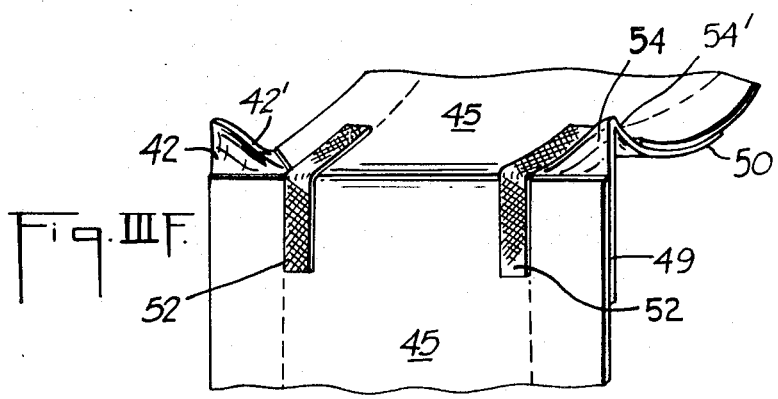
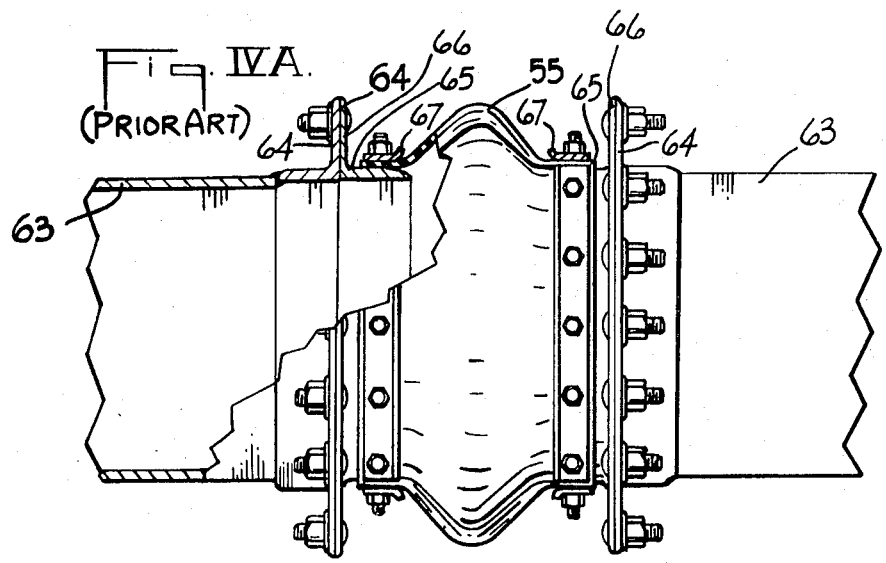
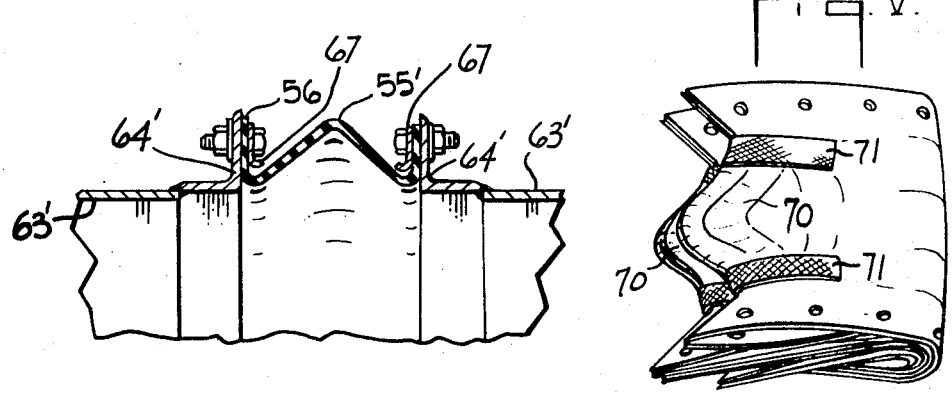
INVENTORS,
FREDERICK BRUCE PINTARD
GEORGE MICHAEL MOLLICK
BY
John A. McKinney
ATTORNEY

TUBULAR CONNECTOR FOR EXPANSION JOINTS

BACKGROUND OF THE INVENTION

This invention relates to an article of manufacture for eliminating the necessity of intermediate metal flanged connectors for connecting flanged ducts to form a heat-expandable joint, particularly those expandable joints made of a heat-resistant fabric.

Prior to this invention, heat expansion joints for joining separate conventional metal ducts having a metal flange at each end of adjacent ducts required the tubular connector for each expansion joint to be secured to a separate metal flange so that the heat expansion joint was formed by attaching each metal flange of the tubular connector to one of the separate duct flanges in a face to face relationship. Such prior art joint flanges were secured to the expansion joint material forming the tubular connector by appropriate means known to the art such as by bolting, and the metal flange of the tubular connector was thereafter (when the joint was assembled) bolted to the metal duct flange. Typical prior art expansion joints having the metal flange attached to each end thereof include those marketed by Johns-Manville under the trade designation "J-M" Model A-250 and "J-M" Model B-500 The cost of such intermediate metal flanges for the joining of duct work added considerably to the cost of inserting expansion joints, as well as adding to the weight, the space required, and the time and expense of joining the intermediate flange to the joint prior to the joining of the joint flange to the flange of the duct work. Also, prior art and/or conventional metal flange connectors are bulky and expensive to transport.

SUMMARY OF THE INVENTION

An object of this invention is to provide an expansion joint comprising a tubular connector which can be bolted directly to existing duct work flanges thereby eliminating the need of the metal angle and frame required by the standard prior art tubular connectors.

Another object is a tubular connector having a margin thereof bendable outward at about right angles to an opposite margin thereof, whereby the bendable margin is formable into a substantially flat face for mating with the flat face of the duct work flanges.

Another object is a process of making the above tubular connector.

Another object is a flexible and lightweight duct connector and joint that is easily folded and transported.

Other objects become apparent from the preceding and following disclosure.

The foregoing objects are accomplished in accordance with the instant invention by a tubular connector comprising a flexible heat-resistant material which is particularly suited for joining adjacent sections of duct which have angularly related sides. Ducts of this nature are generally formed with flanges having flat surfaces extending at a ninety degree angle to the direction of flow of fluid through the duct. The instant invention provides a tubular connector for this duct whereby the tubular connector may be packaged and shipped to the job site in a flat package. At the job site, the tubular connector is readily formed into a shape corresponding to the duct and with flat surfaces extending at the ninety degree angle in relation to the flow of the fluid through the duct and the expansion joint. The flat surfaces of the tubular connector mate with the flat surfaces of the flanges and are readily secured thereto by conventional means such as nuts and bolts.

BRIEF DESCRIPTION OF THE DRAWINGS

FIGS. IA, B, C, and D illustrate four sheets of substantially identical flexible material which sheets may be joined at their edges to one another to form a flexible tubular connector of this invention;

FIGS. IIA AND B illustrate a typical appearance of a flexible tubular connector of this invention before and after the end portion is folded back;

FIGS. IIIA-F illustrate flexible corner connectors and how they are used in forming tubular connectors wherein;

FIG. IIIB illustrates the manner of placing the flexible corner connector of FIG. IIIA in the corner of FIG. IIB conduit between the mating portions 6 and 6' of sheets C and D;

FIG. IIIC illustrates two flexible corner connectors joined by an integral strip;

FIG. IIID illustrates a sheet of flexible material suitable for forming a flexible expansion conduit having a channel of substantially square cross section, prior to attaching and sealing thereto a plurality of flexible corner connectors, such as illustrated in FIG. IIIC, to produce the product illustrated in FIG. IIIE which may then be joined at opposite ends to form a square tubular connector;

FIG. IIIF illustrates in section the appearance of both ends of one corner of a flexible tubular connector produced from the sheet illustrated in FIG. IIIE;

FIG. IVA illustrates a typical prior art expansion joint of either rectangular or square cross section, connecting two separate ducts;

FIG. IVB illustrates two separate flanged ducts connected by a tubular connector of this invention; and FIG. V is a tubular connector folded in flat form for packaging.

DESCRIPTION OF THE PREFERRED EMBODIMENT

It should be understood that although the figures discussed above illustrate primarily joints of the four-cornered expansion joint type and illustrate primarily expansion-type joints having a square or rectangular cross section, it is within the scope of this invention to employ joints having cross section of three or more corners, such as three, four, five, and the like, for joints of any desired type, the illustrated "expansion" joints merely being a preferred type for embodiments of this invention.

In a preferred embodiment of the invention, the tubular connector for cooperating with adjacent ducts to form an expansion joint comprises a flexible fabric material. This fabric material is of a type well known in the prior art, resistant to temperatures ranging up to at least 250° F. for a large number of hours, such as about 400 to 1,000 hours. Other fabric materials or other materials of a flexible nature resistant to temperatures up to about 750° F. or higher, such materials also being well known in the prior art, may also be used. Although the sheet material from which the flexible tubular connector of this invention is composed may be of any suitable flexible material, such as formable and bendable metal, it is preferred that the material comprises a flexible but substantially resilient and formable rubber sheet material such as a rubberized fabric, such as a neoprene asbestos cloth. Other typical and preferred heat resistant fabrics include glass cloth, wire-mesh cloth, and the like.

Referring to FIGS. IA, B, C, and D, there are illustrated four cut sheets A, B, C, and D, which when combined in an end-to-end relationship form a tubular connector for an expansion joint of the type illustrated in FIG. IVB. For example, the edge of the central portion 9 fabric A is joined and sealed by appropriate means such as with neoprene cement, to the edge of the central portion 9' of fabric B. Similarly, the edge of fabric A along the central portion 10 is joined to the edge of fabric C along the central portion 10', the edge of the central portion 11 of fabric C is joined to the edge of the central portion 11' of fabric D, and the edge of the central portion 12 of fabric D is joined to edge 12' of fabric B. Thereby, the corner 1 of fabric A meets the corner 1' of fabric B, the corner 2 of fabric A meets the corner 2' of fabric B, the corner of fabric A meets the corner 3' of fabric C, the corner 4 of fabric A meets the corner 4' of fabric C, the corner 5 of fabric C meets the corner 5' of fabric D, the corner 6 of fabric C meets the corner 6' of fabric D, the corner 7 of fabric D meets the corner 7' of fabric B, and corner 8 of fabric D meets the corner 8' of fabric B. The angle 13 is about 90° and the angle 13' is about 45°.

FIGS. IIA and IIB illustrate the shaped appearance of the tubular connector with the flexible corner connector means attached to the fabric sheets A, B, C, and D and with the flexible and bendable connector means bent outwardly to form a flat base identified typically as 33 and 34. FIG. IIA illustrates the appearance of the flexible tubular connector prior to bending outward to form the flat faces 33 and 34 which may be placed flush with the face of the flange member of a duct and bolted thereto by passing bolts through the holes 64 and 65 provided therefor.

FIG. IIIA illustrates a flexible corner connector of this invention comprising a strip 16 integral with and between two portions 17 and 18. The strip 16 is bendable along dotted line 19. Angle 14 is about 90°, and angle 14' is about 45°. A corner connector of this type is used as a reinforcement for and securement of the adjacent mated corners of the flexible sheets A, B, C and D of FIG. I.

The tubular connector illustrated in FIGS. IIA and IIB is preferably formed from sheets of the type illustrated in FIGS. IA, B, C, and D. Sheet A of FIG. IA would be placed over sheet B of FIG. IB with the corners 1 and 1', central portions 9 and 9', and corners 2 and 2' in superposed position. A suitable means would be used to secure the corresponding edges of central portions 9 and 9', between the dotted lines $a$ and $b$, to each other. Such means could comprise a suitable cement applied to the adjacent edges of the sheets. However, the preferred way is to use a boot of flexible material, such as rubber, which is secured to the outer surfaces of the central portions 9 and 9' between the dotted lines $a$ and $b$. Such boot 70 and reinforcing strips 71 are illustrated in the folded tubular connector in FIG. V. A flexible corner connector of the type illustrated in FIG. IIIA is then folded along the dotted line 19 and placed in position between the superposed corners 1 and 1' and 2 and 2'. A suitable cement would be used to secure the surface of portion 17 to the adjacent surface of portion 1 and the surface 18 to the adjacent surface of portion 1'. Each corner would then be formed in a similar manner such as by next superposing corners 3 over 3', central portions 10 over 10' and corners 4 over 4' and repeating the foregoing securing steps. When all of the corners have been joined in the manner described above, the tubular connector may be folded along sides A and D and then in half upon itself into a relatively flat package as illustrated in FIG. V so that the four edges of the rectangularly shaped tubular connector are superposed.

It is noted that the corner connector is positioned between and secured to the inner surfaces of the superposed sheets A and B. This is done so that when the tubular connector is folded back to form the flanged portions, the corners will present a uniform and integral surface to be secured to the flanged ends of the duct. If the corner connector were placed over and secured to the outer surfaces of the superposed sheets A and B, there would be an open passageway through which fluid could escape when the tubular connector was folded back to form the flanged portions. The strip 16 of the corner connector functions to provide means for insuring a fluid tight seal along the mating corners 1 and 1', 2 and 2' with adjacent portions of the central portions 9 and 9'. In general practice the strip 16 is in sealing relationship with the means used to join central portions 9 and 9'.

Another modification of a tubular connector for use in forming an expansion joint of the instant invention is illustrated in FIG. IIIF which shows one corner of the tubular connector for an expansion joint. The tubular connector illustrated in FIG. IIIF is made, as illustrated in FIGS. IIID and E, by taking a strip of flexible material 45 and cutting a plurality of space slits 46 along each of the longitudinal edges thereof. A cutout 46a is made in each corner so as to form a slit having dimensions similar to slit 46 when the edges 51 and 51' of the sheet 45 are mated together in adjacent edge to edge relationship. The flexible corner connector for the embodiment illustrated in FIG. IIIF is illustrated in FIG. IIIC and comprises two corner connectors of the type similar to that illustrated in FIG. IIIA joined by an integral strip 16a. The corner connector illustrated in FIG. IIIC is adapted to be folded along the dotted line 16b.

In forming the embodiment illustrated in FIG. IIIE, a corner connector of the type illustrated in FIG. IIIC is folded along the dotted line 16b. The sheet 45 is folded along one of the dotted lines 46b and the folded corner connector is placed so that the adjacent edges 42 and 42' and 54 and 54' extend through the slits 46. A suitable cement is then used to bond surface 48 to an adjacent surface of the sheet 45 and surface 47 to an adjacent section of the surface 45. Likewise, surfaces 49 and 50 are cemented to adjacent surfaces of the sheet 45. Also, the surfaces of strip 16a are cemented to the adjacent surfaces of the strip 45 along the folded line 46b. This procedure is repeated for the other two fold lines 46b so as to form the product illustrated in FIG. IIIE. The edges 50 and 51 are then brought into adjacent relationship and another corner connector used to secure these surfaces together to complete the expansion conduit. Reinforcing strips 52, as illustrated in FIG. IIIF, are then secured to the outer surfaces of the sheet 45.

In the foregoing descriptions of the tubular connector for an expansion joint as illustrated in FIG. IIB and IIIF, it is understood that in all instances either the flexible corner connector of FIG. IIIA or FIG. IIIC may be used.

FIGS. IVA and IVB illustrate expansion joints of the old and new type. As illustrated in FIG. IVA, adjacent ducts 63 having flanges 64 are connected by a tubular connector 55. The flexible portion of the tubular connector 55 is connected by nuts and bolts to a member 65 having a flange 66 for mating with the flange 64. The flanges 64 and 66 are then secured together by suitable nuts and bolts.

As illustrated in FIG. IVB, the adjacent ducts 63' having the flanges 64' are connected by a tubular connector 55' of the instant invention. As illustrated in FIG. IVB, the tubular connector 55' has been folded back along the edges thereof so as to form a flat surface such as that illustrated in FIG. IIA as 33 and 34 for mating with the flat surfaces of the flanges 64'. The tubular connector is then secured directly to the flanges 64'. In all instances a strip 67 is used to insure a fluid tight seal between the flexible tubular connector and the adjacent flange surfaces under the pressure applied through the nuts and bolt.

Tubular connectors for expansion joints of the type illustrated in FIGS. IIB and IIIF having a 3 feet×3 feet rectangular opening were formed from sheet material comprising a neoprene asbestos cloth having a thickness of one-eighth inch. The tubular connectors were connected to a simulated duct system having cycling means so as to move the adjacent duct sections toward and away from each other to simulate the effect of temperature change under operating conditions. The duct system, including the tubular connectors, was subjected to an internal pressure of about 1.0 to 1.5 p.s.i. with a leakage test pressure of about 3.0 p.s.i. The system was maintained at a temperature of 250° F. and was cycled once every 55 seconds to simulate change from ambient temperature to 250° F. The expansion joint functioned satisfactorily without leakage or rupture for about 462 hours and 30,000 cycles.

We claim:
1. An expansion joint comprising:
   a. a pair of adjacent ducts each having a flanged end,
   b. a tubular connector having a specific configuration and wall structure and being made from a flexible fabric material such that said tubular connector may be easily folded in flat form for packaging and shipping and then unfolded to be positioned between said ducts,
   c. said tubular connector having bendable terminal end portions adapted to be folded back to form flanged portions for mating with said flanged ends of said ducts,
   d. said bendable terminal end portions when folded back being continuous in a circumferential direction, and
   e. means securing said tubular connector through its terminal end portions folded back providing said flanged portions to said flanged ends of said ducts.
2. An expansion joint as defined in claim 1 wherein:

a. said flanged end of said duct has surfaces lying in a plane passing through said duct in a direction transverse to the direction of the flow of fluid through said duct; and b. said terminal end portions folded back providing flanged portions of said tubular connector have surfaces lying generally in a plane which is substantially parallel to said plane of said surfaces of said duct.

3. An expansion joint as defined in claim 2 wherein:

a. the transverse cross sectional configuration of said flanged ends of said duct is generally rectangular, and b. the transverse cross sectional configuration of said terminal end portions folded back providing the flanged portions of said tubular connector is generally rectangular.

4. An expansion joint as defined in claim 3 wherein:

a. each of said terminal end portions folded back providing the flanged portions of said tubular connector has surfaces meeting at corner intersections, and b. each of said corner intersections has an integral surface facing said flanged end of an adjacent duct.

5. In an expansion joint for joining flanged ends of adjacent ducts, the improvement comprising:

a. a tubular connector having a specific configuration and wall structure and being made from a flexible rubberized fabric material such that said tubular connector may be easily folded in flat form for packaging and shipping and then unfolded to be positioned between said ducts, b. said tubular connector having bendable terminal end portions adapted to be folded back to form flanged portions for mating with said flanged ends of said ducts, c. said bendable terminal end portions when folded back being continuous in a circumferential direction, and d. means securing said tubular connector through its terminal end portions folded back providing said flanged portions to said flanged ends of said ducts.

6. The improvement as defined in claim 5 wherein:

a. the transverse cross sectional configuration of said terminal end portions folded back providing flanged portions of said tubular connector is generally rectangular.

7. In an expansion joint for joining flanged ends of adjacent ducts, the improvement comprising:

a. a tubular connector comprising a flexible material, b. said tubular connector having terminal end portions adapted to be folded back to form flanged portions for mating with said flanged ends of said ducts, c. said terminal end portions when folded back forming flanged portions being continuous in a circumferential direction, d. the transverse cross sectional configuration of said terminal end portions folded back providing flanged portions of said tubular connector being generally rectangular and having corners, e. each of said folded back flanged portions with corners comprising two edges of flexible material in adjacent but spaced relationship, f. a flexible corner connector secured to the surfaces of said flexible material adjacent said edges, and g. means securing said tubular connector through its terminal end portions folded back forming flanged portions of said tubular connector to said flanged ends of said ducts.

8. An expansion joint as defined in claim 7 wherein said corner connector comprises:

a. an end section for a corner at each axial extremity of said tubular connector, and b. a strip of flexible material connecting said end portions.

* * * * *